United States Patent Office 3,095,983
Patented July 2, 1963

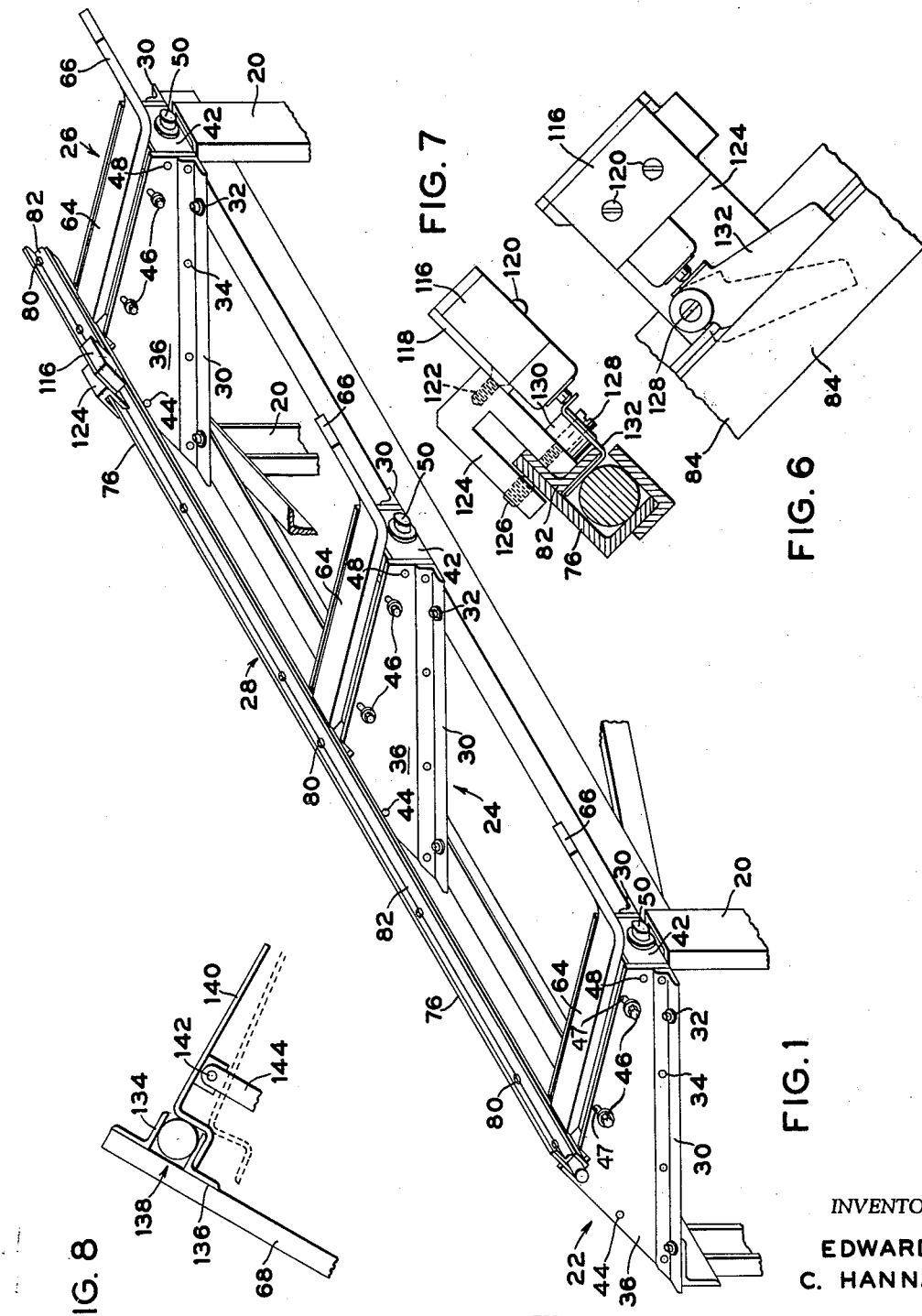

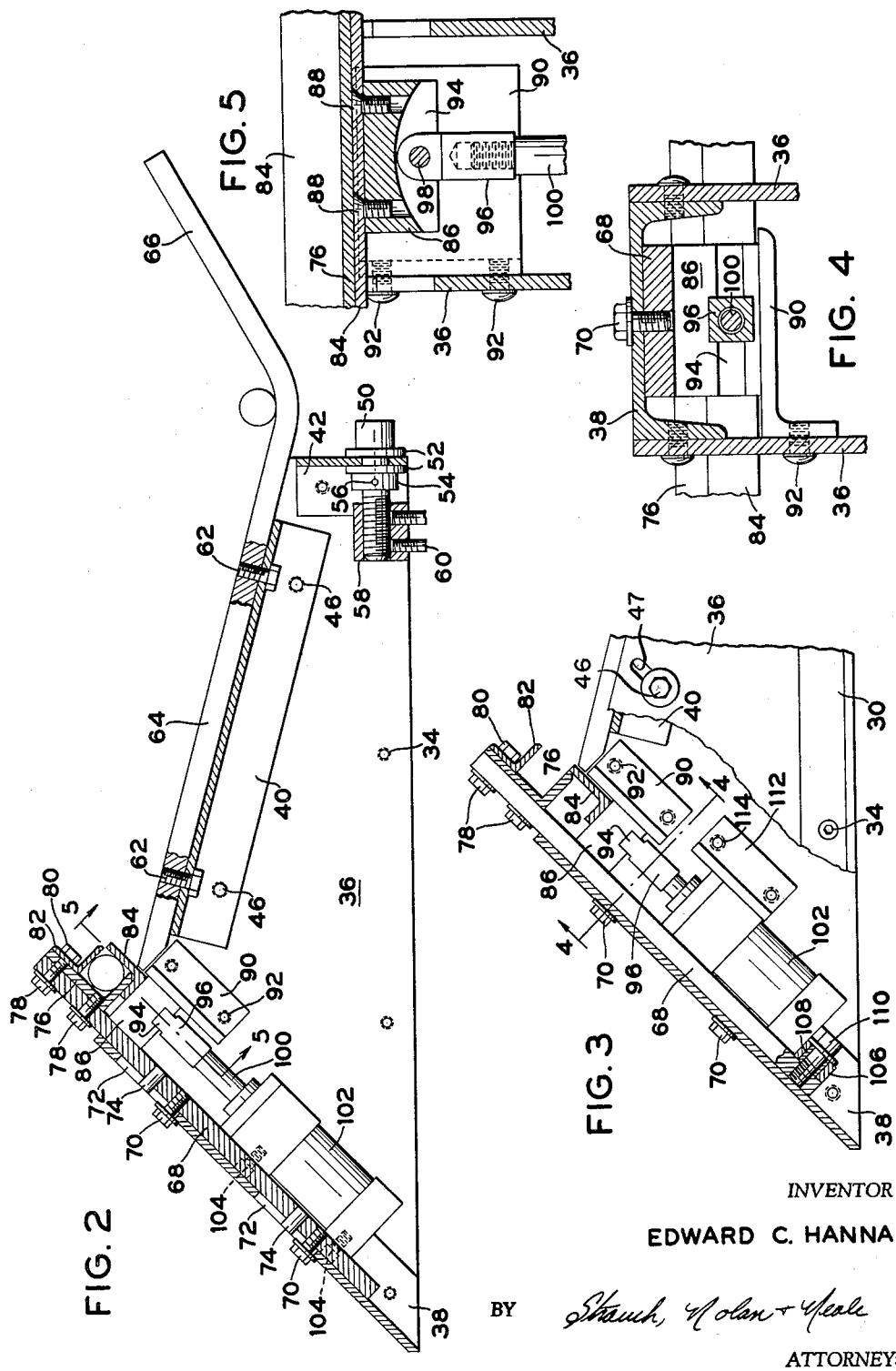

3,095,983
APPARATUS FOR HANDLING ELONGATED
WORKPIECES
Edward C. Hanna, Waynesboro, Pa., assignor to Landis
Machine Company, Waynesboro, Pa., a corporation of
Pennsylvania
Filed Apr. 8, 1960, Ser. No. 20,954
5 Claims. (Cl. 214—1)

This invention concerns apparatus for supporting and handling long cylindrical bars and more particularly apparatus for handling such bars as they are being moved axially and are simultaneously rotated.

This condition is encountered in a number of types of machine tools which perform a metal forming operation upon relatively long lengths of bar stock. Among such operations may be grinding, polishing, straightening and thread forming. In all such cases it is desirable to constrain the rotating and axially advancing workpiece as it emerges from the machine tool to prevent it from whipping and bouncing, to protect the surface finish, thread profile, etc. from damage.

Heretofore, such workpieces have been received from the machine tool in a simple tube positioned and aligned in the proper direction. When a workpiece had been passed completely through the machine, it was necessary to remove the finished workpiece axially from the tube by hand. In addition to this manual operation the previous system had the disadvantage that the receiving tube was not adjustable as to diameter and consequently was able to confine closely only one size of workpiece.

The apparatus of the present invention eliminates the above disadvantages by providing means for closely confining a rotating, axially advancing workpiece, which means can be opened to permit the workpiece to escape laterally, as by gravity, from its confinement at the end of the machining operation. The release of the workpiece is accomplished by mechanical means that may be operated by the workpiece itself, thus rendering the process automatic and manual intervention unnecessary. The receiving means is constructed to permit it to be adjusted so that any diameter of rod within the range of the machine may be closely confined during its exit from the machine. Further, the lateral removal of a finished workpiece eliminates the need for the considerable amount of extra floor space that is necessary when the workpieces are removed axially from the end of a unitary supporting means.

Accordingly, it is an object of the invention to provide means for supporting and confining a rotating and axially advancing rod as it is being discharged from a continuous-operation machine tool, said means being capable of discharging the completed rod laterally.

Another object is to provide an apparatus of the above description in which the discharge of the rod from the supporting and confining means is effected automatically.

It is a further object of the invention to provide automatic means for discharging the rod from the apparatus which is actuated by the rod itself and is adjustable in accordance with the length of the rod.

A still further object is to provide means for adjusting the above-mentioned supporting and confining means in accordance with the diameter of the workpiece, while maintaining the axis of the workpiece in alignment with the working station of the machine tool.

Additional objects and advantages will be apparent from the following description and the accompanying drawings, in which:

FIGURE 1 is an oblique drawing showing a preferred embodiment of the entire mechanism for receiving a rod as it is discharged from a machine tool;

FIGURE 2 is a transverse section through the support nearest the entrance end of the mechanism;

FIGURE 3 is a portion of a similar section through one of the other supports;

FIGURE 4 is a partial sectional view along line 4—4 of FIGURE 3;

FIGURE 5 is a partial sectional view along line 5—5 of FIGURE 2;

FIGURE 6 is a front elevation showing the mounting of the limit switch for operating the moving parts;

FIGURE 7 is a side elevation of the device shown in FIGURE 6, partially in section; and FIGURE 8 is a diagrammatic sectional view similar to FIGURES 2 and 3 but showing another embodiment of the invention.

The invention comprises a table 20, the top portion of which is shown in FIGURE 1 and which serves to elevate the work handling mechanism of the present invention to the work station of the machine tool with which it is intended to cooperate. The table may be of any convenient or conventional design, the one shown being composed of simple structural steel members. On the table 20 are mounted a series of operating assemblies, indicated generally at 22, 24 and 26, for supporting the channel or guideway 28 through which the workpiece is passed.

Each of the assemblies 22, 24 and 26 comprises a pair of angle irons 30 disposed transversely upon table 20 in spaced apart and parallel relationship. Each angle iron 30 is secured, as by screws 32, to the top of the table 20 and has attached thereto by screws 34 (see also FIGURE 3) an upright plate 36. Each pair of plates 36 is connected and held in spaced-apart relation by channel irons 38, 40 and 42. Plates 36 are joined to channel 38 by screws 44, to channel 40 by screws 46 and to channel 42 by screws 48.

The channel 42 is preferably disposed with a face perpendicular to the base of the operating assembly 22, 24 or 26 in which it is mounted, as shown in FIGURE 2. A large screw 50 is affixed with its axis horizontal in the web of each channel 42 by means of washers 52, one on each side of the web and by means of a collar 54, pinned to the screw 50 by a pin 56. Thus the screw 50 is held against axial movement relative to the channel 42. The screw 50 is threadedly engaged in a block 58 which is secured in a stationary position on the top of table 20 by means of screws 60. When the screws 32 are loosened, the entire operating assembly may be adjusted laterally relative to the table 20, by rotation of the screws 50, elongated openings being provided in the angle irons 30 around screws 32 to permit this movement.

The channel 40 has its largest surface facing generally upward but inclined downwardly from the vicinity of the work guideway 28. To this surface screws 62 secure a chute member 64 to receive the workpieces from the guideway 28. When the workpieces are released from the guideway 28, as will be described later, they roll down the inclined top surfaces of the members 64 and may be delivered thereby to any suitable container or conveyor. In the preferred embodiment of the invention the outer ends 66 of the members 64 are turned up so that a quantity of workpieces will be retained on the members 64 where they may be bundled for removal in groups.

The channel 38 is also inclined at a substantial angle to the base of each operating assembly 22, 24 and 26. A plate 68 is attached to the inside of the web of channel 38 by screws 70 (FIGURE 4) which pass through elongated slots 72 in channel 38 so that the plate 68 may be adjusted upward or downward when the screws 70 are loosened. Pins 74 may also pass through the web of channel 38 and into the plate 68 to locate the plate in accurate position laterally.

To the top extremity of each of the plates 68 an angle iron 76, extending the full length of the apparatus, is secured by screws 78. The angle 76 constitutes two sides of the guideway 28 and at intervals along the angle 76, bolts 80 secure a smaller angle iron 82 thereto, the latter constituting a third or top side of the guideway 28. The fourth side of the guideway, facing the delivery chute members 64, is formed by an angle iron 84. The angle iron 84 is supported by sliding blocks 86, one in each of the operating assemblies 22, 24 and 26 and is attached to said sliding blocks 86 by means of screws 88 (FIGURE 5). An angle iron 90 is secured by screws 92 to one of the side plates 36 in each operating assembly and serves to confine the sliding block 86 between itself and the plate 68. Each sliding block 86 is provided with a transverse rectangular slot 94 to receive one end of a connecting link 96 which is fastened to the sliding block 86 by means of a pin 98.

The other end of link 96 is threaded internally to receive the threaded end of a piston rod 100 of a fluid motor or air cylinder 102. The cylinder 102 may be attached, as shown in FIGURE 2, to the underside of plate 68 by screws 104. It is, of course, unnecessary to install an operating cylinder 104 in every one of the assemblies 22, 24 and 26. It is preferable to employ at least two, which in the example shown will be installed in the end assemblies 22 and 26. If the length of the workpieces requires more supporting assemblies than the three shown in the drawings, the number of operating cylinders may also be increased.

To prevent binding in case all of the pneumatic cylinders do not operate precisely simultaneously, all of the cylinders but one are preferably pivotally mounted. In the example shown the cylinder 102 that is installed in assembly 26 is so mounted (FIGURE 3). The cylinder is provided with an integral lug 106 bored to receive a bushing 108. A screw 110 is passed through the bushing 108 and is threadedly engaged in the lower end of plate 68 and thus constitutes a pivot upon which the cylinder 102 can undergo a limited oscillation. The screws 104 are omitted to permit the cylinder 102 to have a limited rotational movement about the pivot screw 110 and support in this area is provided by an angle iron 112 similar to the support 90 and secured to one of the sides 36 by screws 114.

It will be evident that the size of guideway or enclosure 28 may be enlarged or reduced to accommodate workpieces of different diameters. Also the channel may be shifted as required to keep the workpiece in alignment with the center of the operating station of the machine tool with which it is associated. The angle iron 82 is provided with slots surrounding the bolts 80 so it may be moved relative to the plate 68. The above-mentioned slots 72 in the channel 38 permit the plate 68 and everything attached thereto to be raised and lowered. Also, the slots 47 in the member 36 through which screws 46 extend are elongated in a direction parallel to the path of movement of the plate 68 to permit adjustment of the chute 64. Finally, as described above, the entire assembly may be moved laterally by rotating the screw 50. Thus it is possible to confine closely any diameter of workpiece within the range of the apparatus while maintaining its center at the same place for all sizes.

A limit switch 116 (FIGURES 1, 6 and 7) is mounted on the guideway 28 so as to be adjustable along the length of the guideway according to the length of the work. The switch 116 is attached to a plate 118 by screws 120 and the plate 118 in turn is secured by screws 122 to a bracket 124. The bracket 124 is formed to extend on both sides of the projecting sides of angle irons 76 and 82 where it is adjustably secured by screws 126. A screw 128 attaches to the bracket 124 a spacing member 130 and a trip lever 132. The lever 132 is made of relatively thin sheet metal and is bent to be disposed in operative position relative to the switch 116 and extends into the guideway 28 to be operated by the end of a workpiece.

Another embodiment of the invention is illustrated diagrammatically in FIGURE 8. Two angle irons 134 and 136 are mounted on the upright plate 68 to form therewith three sides of a work guideway 138. The fourth enclosing side is formed by the bent lip of a chute member 140 corresponding to the members 64 of the embodiment previously described. In this instance the member 140 is pivotally mounted and is attached, as at 142 to the piston rod 144 of the operating cylinder. When the device is in operation, the guideway is first closed as shown in FIGURE 2. The operation of the machine tool causes the rotating workpiece to be fed axially into the opening between angles 76, 82 and 84, which confine it closely and support it while preventing it from whipping and being damaged. When the workpiece leaves the machine tool, its forward end in the guideway strikes the lever 132 and rocks it to operate the switch 116. By means of a simple, conventional, electrical connection the switch 116 causes the piston rods 100 of the cylinders 102 to retract, drawing with them the links 96, blocks 86 and angle 84. Thus the side of the guideway is opened along its entire length as shown in FIGURE 3, allowing the workpiece to roll laterally onto the chute members 64. As the workpiece leaves the guideway, it releases the lever 132 which drops back into its original position, releasing the switch 116. As a consequence the cylinders 102 extend the piston rods 100 to return the angle 84 to its upper position, closing the guideway for the reception of the next workpiece.

The operation of the embodiment shown in FIGURE 8 is similar with the obvious exception that the guideway is opened when the cylinder lowers the member 140 whose top surface then serves as a chute for the escaping workpiece.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for receiving elongated workpieces as they are delivered from a forming mechanism comprising a stand, means forming a channel, mounting means supporting said channel on said stand, said channel being adapted to closely surround and support said workpiece along its length, means for adjusting the position of said channel to dispose a workpiece in said channel in alignment with said forming mechanism, means mounting at least one wall of said channel for movement with respect to the other walls to thereby vary the size of said channel, power means for periodically moving one of the walls of said channel to permit said workpiece to move laterally out of said channel, and means responsive to movement of said workpiece out of said forming mechanism to actuate said power means.

2. Apparatus for receiving elongated workpieces as they are delivered from a forming mechanism comprising a stand, a pair of wall members mounted on said stand in parallel spaced relation, one of said wall members being L-shaped to form one side portion and the bottom portion of a workpiece supporting channel, the other wall forming the top portion of said channel, an additional wall member mounted on said stand for shifting movement between a first position in which it forms the other side portion of said channel and a second position out of alignment with said channel, and power means for periodically moving said additional wall member between said first and second positions to selectively retain and release a workpiece in said channel.

3. Apparatus according to claim 2 wherein said pair of wall members are mounted for relative bodily movement to vary the spacing between said top and bottom portions of said channel.

4. The apparatus according to claim 2 together with mounting members supporting each of said wall members and means for supporting said mounting members on said stand for bodily shifting movement to adjust the position of said channel to dispose a workpiece in said channel in alignment with said forming mechanism.

5. Apparatus for receiving elongated workpieces as they are delivered from a forming mechanism comprising a stand, wall members carried by said stand to form a U-shaped channel aligned with said forming mechanism, said channel having straight top and bottom walls and a side wall, a work-receiving chute pivotally carried by said stand, a lip on said chute normally forming the opposite side wall of said channel, and means for pivoting said chute to move said lip out of register with said channel to release a workpiece from said channel for delivery to said chute.

References Cited in the file of this patent

UNITED STATES PATENTS

| 581,934 | Huber | May 4, 1879 |
| 2,198,644 | Wettengel | Apr. 30, 1940 |
| 2,577,203 | Mariotte | Dec. 4, 1951 |

FOREIGN PATENTS

| 677,300 | Germany | June 22, 1939 |